United States Patent [19]
Herr-Hoyman et al.

[11] Patent Number: 5,727,156
[45] Date of Patent: Mar. 10, 1998

[54] INTERNET-BASED AUTOMATIC PUBLISHING SYSTEM

[75] Inventors: Dirk Herr-Hoyman, Madison, Wis.; Louis Hubert, Kalamzoo, Mich.

[73] Assignee: HotOffice Technologies, Inc., Boca Raton, Fla.

[21] Appl. No.: 630,287

[22] Filed: Apr. 10, 1996

[51] Int. Cl.$^6$ .................... G06F 13/00; G06F 15/16; H04L 9/00
[52] U.S. Cl. ................ 395/200.49; 395/762; 395/792; 395/244; 395/226; 395/610; 395/187.01
[58] Field of Search ..................... 395/226, 235, 395/239, 244, 601, 200.09, 200.12, 762, 792, 610, 186, 187.01; 380/23, 25

[56] References Cited

U.S. PATENT DOCUMENTS

| | | | |
|---|---|---|---|
| 5,336,870 | 8/1994 | Hughes et al. ................ | 235/379 |
| 5,339,361 | 8/1994 | Schwalm et al. ............... | 380/23 |
| 5,343,529 | 8/1994 | Goldfine et al. ............... | 380/23 |
| 5,530,848 | 6/1996 | Gilbert et al. ................. | 395/683 |
| 5,636,282 | 6/1997 | Homquist et al. ............... | 380/25 |

OTHER PUBLICATIONS

Nesbitt, Kenn. "Data entry on the World Wide Web, part 2." Data Based Advisor (Aug. 1995 v13 n7): n. pag. CD. Computer Select Dec. 1995.

Linthicum, David S. "Client/Server unraveled." PC Magazine (Mar. 26 1996 v15 n6) n. pag. CD. Computer Select Dec. 1996.

Goldberg et al. "Beyond the Web: Excavating the Real World Via Mosaic." (1994): n. pag. Online. The Mercury Project. Internet 02 May 96. Available: http://www.usc.edu/dept/raiders/paper/.

"SMARTBANNER™—Focalink's Hyperlink Advertising Management Technology," located at http://www.mango.focalink.com/home/smartbanner.html.

T. Berners–Lee, et al.; "Hypertext Transfer Protocol–HTTP/1.0," Working Group, Internet–Draft, <draft–ietf–http–v10–spec–05.ps> (Expires Aug. 19, 1996), Feb. 19, 1996, pp. 1–10.

E. Nebel, et al.; "Form–Based File Upload in HTML," Network Working Group, Request for Comments (RFC) 1867 (Xerox Corporation, Nov. 1995), pp. 1–13.

*Primary Examiner*—Dinh C. Dung
*Attorney, Agent, or Firm*—Philip H. Albert; Townsend and Townsend and Crew

[57] ABSTRACT

A simple method and apparatus for posting hypertext documents to a hypertext server so as to make the hypertext documents accessible to users of the hypertext document system while securing against unauthorized modification of the posted hypertext documents. The hypertext documents form a portion of the World Wide Web and a process for posting hypertext documents begins with an author authoring the hypertext pages on a client computer, sending an add request to a server computer, causing the generation of a unique identifier for the author of the hypertext document, obtaining a charge authorization from the author, and sending a database entry request from the client to the server comprising the unique identifier, the charge authorization and the hypertext files comprising the document. At the server, the validity of the charge authorization is verified, and if the charge authorization is valid, the hypertext pages are stored in association with the unique identifier and the client is provided with a password needed to effect future modifications of the hypertext pages so published.

4 Claims, 7 Drawing Sheets

INTERNET-BASED AUTOMATIC PUBLISHING SYSTEM

BACKGROUND OF THE INVENTION

The present invention relates to hypertext networks such as the World Wide Web, and in particular to remote management of published hypertext pages.

With the exponential growth of the World Wide Web, a distributed system of linked hypertext pages, many nontechnical businesses and persons will want to be authors on the World Wide Web. Typically, the process of publishing on the World Wide Web is for the author to arrange for space on an Internet service provider (ISP) machine which the author then configures to contain the appropriate directory structure necessary for the pages to be published and transfers the pages to be published to the ISP's machine and tests that the pages operate as expected on the ISP's machine. This complex process has left prospective nontechnical publishers with two choices: either educate themselves on the complexities of setting up a web structure or pay someone more knowledgeable to set up the structure and upload the pages.

Therefore, what is needed is a simple system for publishing web pages usable by nontechnical authors.

SUMMARY OF THE INVENTION

The present invention provides a simple method and apparatus for posting hypertext documents to a hypertext server so as to make the hypertext documents accessible to users of the hypertext document system while securing against unauthorized modification of the posted hypertext documents. In one embodiment of such a system according to the present invention, the hypertext documents form a portion of the World Wide Web and a process for posting hypertext documents begins with an author authoring the hypertext pages on a client computer, sending an add request to a server computer, causing the generation of a unique identifier for the author of the hypertext document, obtaining a charge authorization from the author, and sending a database entry request from the client to the server comprising the unique identifier, the charge authorization and the hypertext files comprising the document. At the server, the validity of the charge authorization is verified, and if the charge authorization is valid, the hypertext pages are stored in association with the unique identifier and the client is provided with a password needed to effect future modifications of the hypertext pages so published.

A further understanding of the nature and advantages of the inventions herein may be realized by reference to the remaining portions of the specification and the attached drawings.

DESCRIPTION OF THE PREFERRED EMBODIMENT

Figure 1:
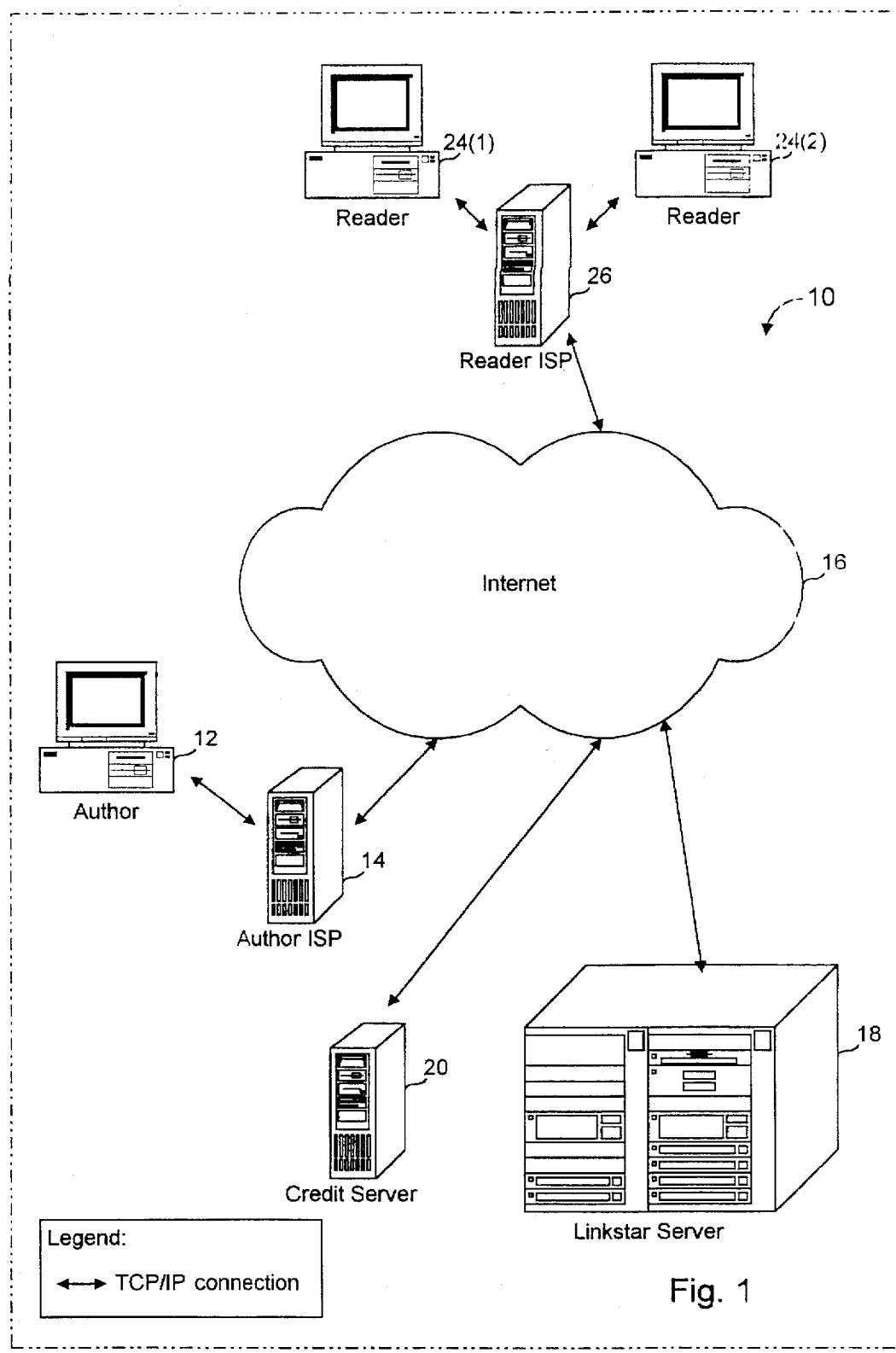
FIG. 1 is a high-level block diagram of a hypertext publishing system according to a present invention.

FIG. 1 is a high-level block diagram showing the various broad hardware components of a directory and publishing system 10 according to the present invention. As shown, system 10 comprises an author computer 12 connected through an author ISP 14 via Internet 16 to a central server 18. The connections are typically TCP/IP (Transmission Control Protocol/Internet Protocol) connections, but other connections and protocols are also possible. For example, the connection between author computer 12 and author ISP 14 might be a SLIP/PPP (Serial Link IP/Point-to-Point Protocol) connection. Author computer 12 is used by an author of a web site to generate the pages for that web site. As used herein, the term "web site" refers to one or more pages following a theme chosen by the author, be it a business, personal, political or other theme or collection of related themes. Where the web site comprises more than one page, the pages are typically linked by reference. Often, a web site is designed with an introductory page ("home page") with the other pages being linked to the home page in a tree structure with the home page being the root of the tree structure. When viewed in this manner, a reader generally starts at the home page and navigates around to the other pages in the web site using the links provided on the home page. As is typical on the World Wide Web, the pages of the author's web site may well include links to pages which are in some way relevant to the author's theme, but which are not controlled, authored or edited by the author of the web site. The particular theme of the web site is dependent on the author's intent in setting up the web site and is limited only by the author's imagination. Where the author is a business, the theme of the web site is typically the offerings and capabilities of the business which authored the web site.

In order for the author to make available the pages of the web site to users of the Internet, the author transfers the pages of the web site from author computer 12 to central server 18 by the mechanism described in greater detail below.

One of the disadvantages of an open system such as internet 16 is that unauthorized persons might attempt to impersonate the author and cause the uploading of unauthorized pages onto central server 18. To prevent such an occurrence, the initial upload of pages from author computer 12 to central server 18 is accompanied by a credit authorization from the author. The credit authorization is verified by central server 18 through a credit server 20. In one embodiment, credit server 20 is a conventional credit card authorization server which is commonly used to process credit card authorization requests. In a preferred embodiment, credit card server 20 is coupled to a financial services network (not shown) which performs the authorization.

Figure 5:
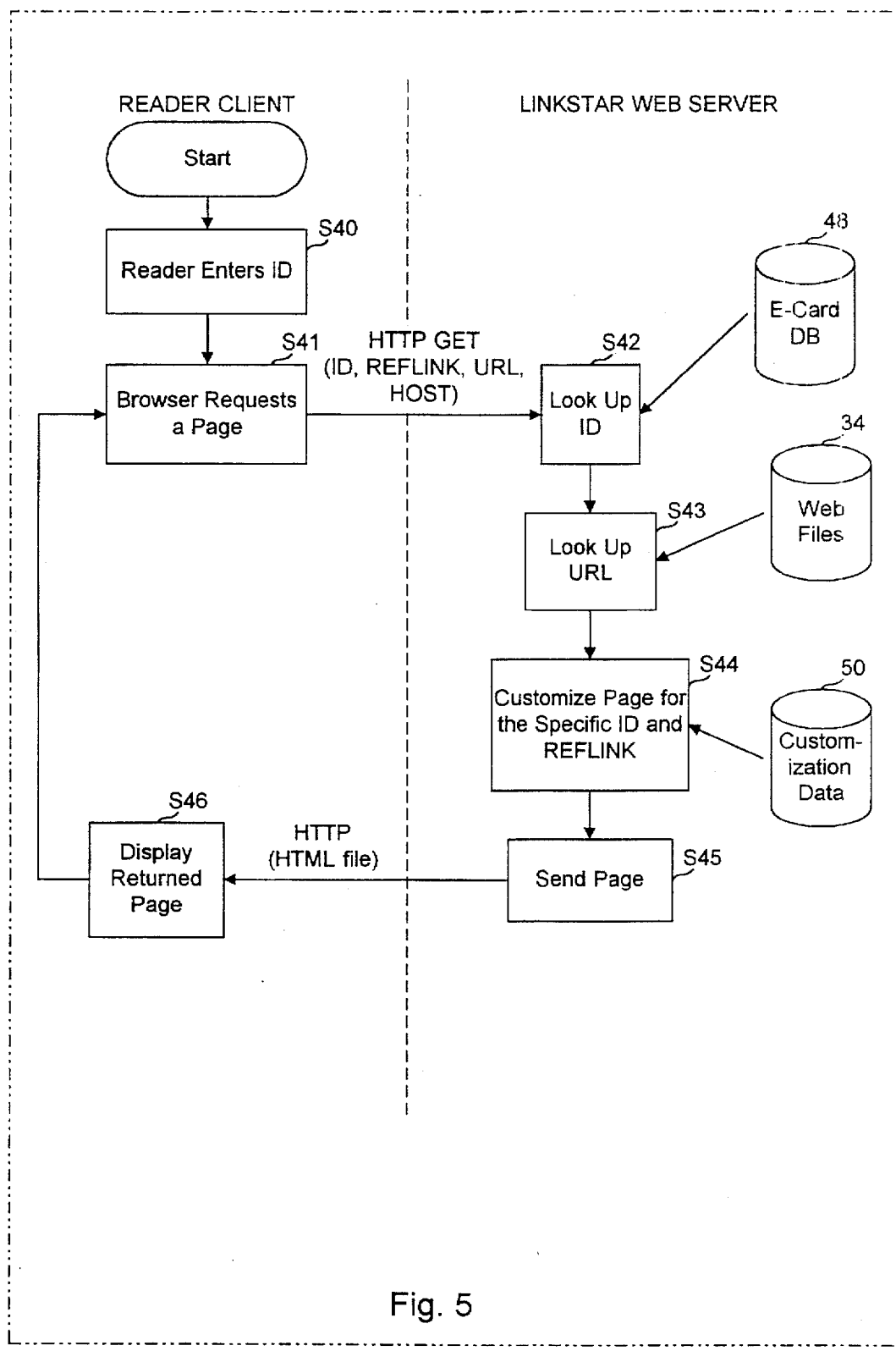
FIG. 5 is a flow chart and data diagram illustrating the process of providing location virtualized hypertext pages.

Also shown in FIG. 1 is two reader computers 24 and a reader ISP 26. Reader computer 24 would be used by a reader to access the authored web site after it is stored on central server 18. As should be apparent, since the interconnection between reader computer 24 and ISP 26 is a TCP/IP connection, a single computer can serve as both author computer 12 and reader computer 24. However, what a reader sees at author computer 12 and reader computer 24 might be different if the web pages are configured to provide different presentations to computers hooked through different ISP computers. This aspect of the present invention is described in further detail in the text accompanying FIG. 5.

Figure 2:
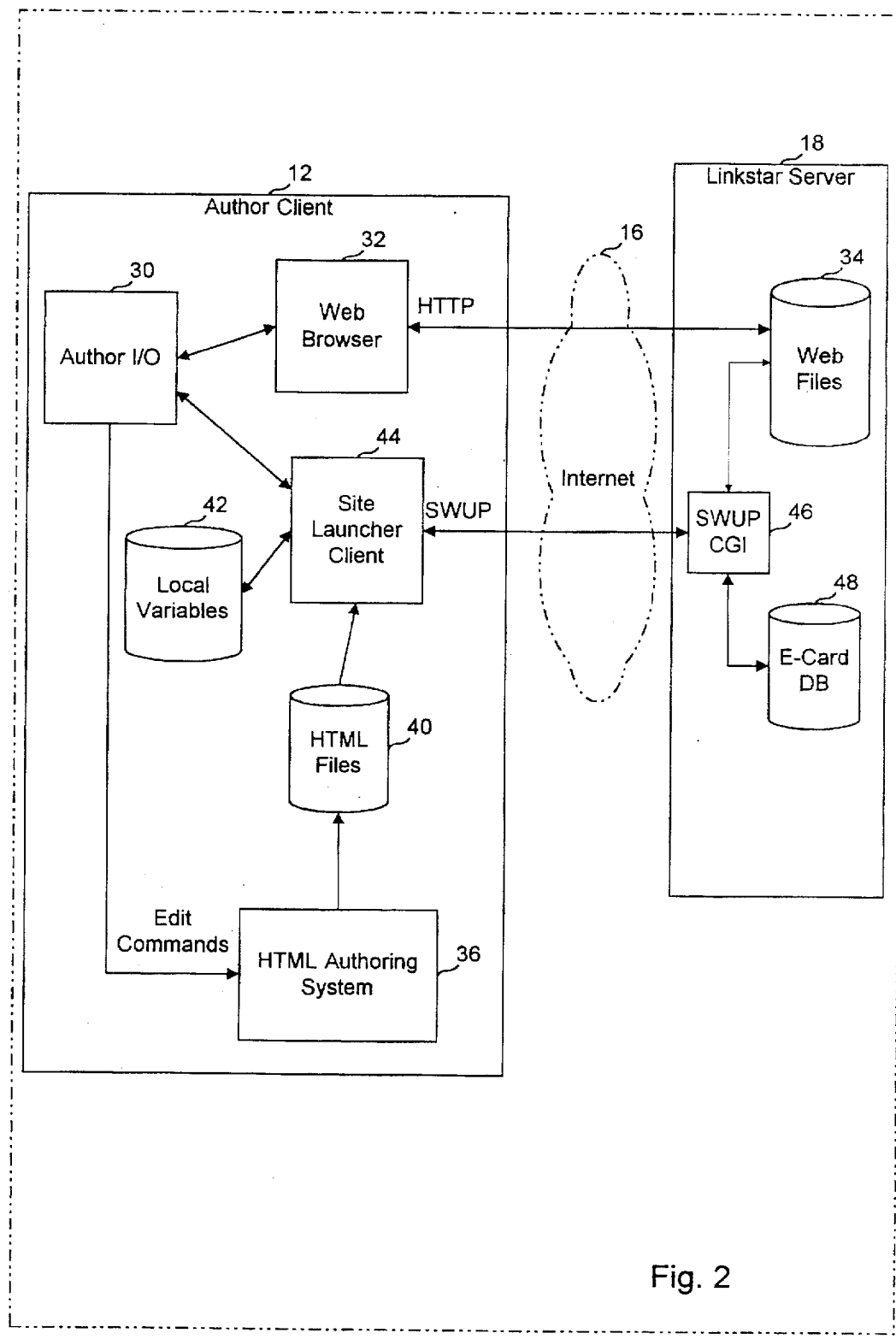
FIG. 2 is a block diagram showing an authoring system and a hypertext server in greater detail.

FIG. 2 shows components of author computer 12 and central server 18 in further detail. Author I/O 30 is a conventional I/O system which allows viewing and editing of computer files. Author I/O 30 is coupled to a web browser 32 to allow HTML (Hypertext Markup Language) files to be viewed and manipulated. The HTML files viewed with web browser 32 are obtained from a web file depository 34 at central server 18 via Internet 16, as is well known in the art of navigating the World Wide Web. Author I/O 30 also provides editing commands to an HTML authoring system 36, whose output is a collection of HTML files 40. Along with local variables 42 stored within author computer 12, a site launcher client 44 interacts with a Simple Web Update Protocol (SWUP) module 46 (explained in more detail below) at central server 18 to upload the HTML files 40 into web file depository 34 while securing the files against unauthorized modification. In addition to the HTML files, site launcher client 44 provides local variables to central server 18 which are stored into an e-Card database 48. Although central server 18 is shown as one machine in FIG. 1 and web file depository 34 and e-Card database 48 are shown on one server it should be apparent from this disclosure that multiple servers can be used and elements can be stored on separate servers.

In operation, the author uses author computer 12 to create and package the HTML files 40 comprising the web site as well as entering local variables 42. Local variables include the author's business or personal name, the unique ID associated with the web site, and possibly an encrypted credit card number and a modification password. A list of other local variables is shown in Appendix A. Local variables 42 contain sufficient information to pas from site launcher client 44 to SWUP module 46 in order to correctly verify authorization and correctly locate the destination for the uploaded web files and database information. The database information is illustrated by the schema shown in Appendix B.

Figure 3:
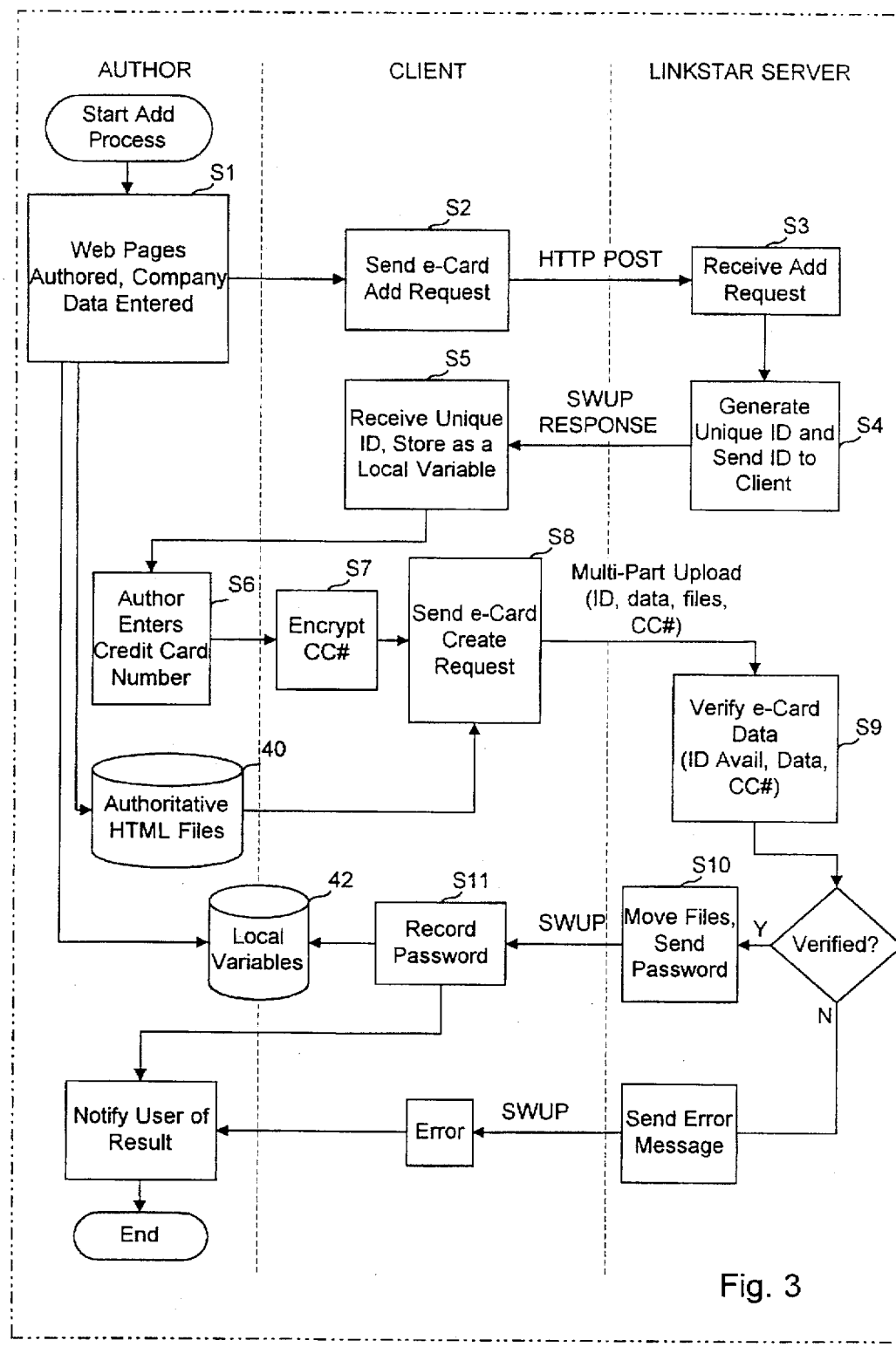
FIG. 3 is a flow chart illustrating the process and data flow associated with adding a new collection of hypertext pages to a hypertext server according to the present invention.

A more detailed description of the upload process will now be described. FIG. 3 is a flow chart and data flow diagram illustrating the process of uploading of a set of HTML pages making up an author's web site. The steps in FIG. 3 are numbered from S1 to S11 and are executed in numerically increasing order except where indicated.

At step S1, the author creates the web pages which form the web site and enters necessary company data (company name, E-mail address, etc.). At step S2, client 44 sends an e-Card Add Request to server 18. The e-Card Add Request is an HTTP/SWUP conversation (steps S2, S3, S4) which might proceed as shown in Appendix C.

The unique ID (C_ID field) is generated based on the company name supplied by the client. In a preferred embodiment, the unique ID is a short sequence of characters related to the company name, possibly including additional characters or digits to ensure that the generated unique ID is unique with respect to all previous generated unique ID's. Of course, any other scheme for assigning unique ID's could be used (e.g., random numbers, sequential numbers, assigned numbers based on time of entry). In the example shown in Appendix C, a "1" is used in the unique ID because the ID "OQV" is presumably already in use.

At step S5, client 44 receives the unique ID and stores it as a local variable. Client 44 then requests a credit card number from the author (step S6), and encrypts the credit card number (step S7). In a preferred embodiment, public key encryption is used, wherein client 44 requests and receives from server 18 a public key for the encryption session. Client 44 uses the received public key to encrypt the credit card number.

Once a credit card number is encrypted, client 44 creates an e-Card Create Request in the form of a multi-part message, such as shown by the example in Appendix D, and uploads the request to server 18 (step S8). Because the e-Card Create Request includes the credit card number of the author and thus serves as a charge authorization, impostors are less likely to upload unauthorized pages since they will have to pay for the posting and storage of such pages.

In step S9, server 18 verifies the e-Card data. As part of the verification process, server 18 checks the validity of the credit card number and checks to insure that the unique ID is still available. Normally, a unique ID supplied in response to an Add Request would still be unique when received as part of an e-Card Create Request, but it is possible for a client to send an e-Card Add Request and then never follow up with an e-Card Create Request. After a predetermined amount of time, the unique ID is released for lack of response and can be used by another author. Another situation where the unique ID would be rejected at step S9 is where the sender of the e-Card Create Request does not actually have the authority to use the unique ID. Yet another situation where the unique ID check may fail is where an author inadvertently sends an e-card create request more than once. After the initial e-Card Create Request, an author should instead use an update request to modify the author's web pages.

If the e-Card data is verified, server 18 moves the files to web file depository 34, updates e-Card database 48 and sends a password to client (step S10) using a SWUP message. At step S11, the password is recorded in local variables 42 and the author is notified of the result, i.e., the successful posting of the web pages to server 18. If the e-Card data is not verified, a SWUP error message is sent to client 44 and the author is notified of the error.

SWUP Messages

In several steps described above, SWUP messages are transferred between server 18 and client 44. SWUP is a protocol novel to the present invention which extends the capabilities of HTTP by providing a mechanism to exchange a wide variety of data types over a protocol designed for the limited transfer of HTML documents between an HTTP server and an HTTP client. A SWUP client (such as client 44) sends messages to a SWUP server such as those messages listed in Table 1, while a SWUP server (such as server 18) sends messages to a SWUP client such as those messages listed in Table 2, typically in response to a message from a SWUP client.

TABLE 1

| SWUP Client Messages | | |
|---|---|---|
| Message | Parameters | Description |
| GMRV | version | Get minimum required version |
| GMLT | version | Get path to the CGI script used for uploading multi-part files |
| GSUB | version | Get path to the CGI script used for submitting e-Card records |

TABLE 1-continued

SWUP Client Messages

| Message | Parameters | Description |
| --- | --- | --- |
| GHBS | version | Get home base for author's pages |
| GCAT | version | Get list of categories |
| GCRD | ID, password | Get the current e-Card for the ID |
| GKBL | version | Get file upload limit in kilobytes (KB) |
| GPFM | Version | Get pricing formula |
| GPRC | KB | Get the price of an upload of size KB |
| GTIN | | Get the time between updates |
| GKEY | data | Get the encryption key |
| GHST | version | Get the host name |

Several of the SWUP client messages have the client version number as their only parameter. For those messages, the version number is not used in filling the request directly, but is used by the server to detect when the client software version is a version which supports or does not support particular features. The response from the server might be dependent on the client version and/or the server version. The details of the SWUP client messages are as follows:

GMRV—the client uses this message to determine the minimum required version, i.e., the oldest version the server is willing to support. The server responds with a $SWUPG-MRV message (see below for details of server messages) and possibly a $SWUPTERMINATE message.

GMLT—the client uses this message to determine the script to specify to an HTTP server when sending a multi-part dataset to be uploaded. The server responds with a $SWUPGMLT message indicating the script.

GSUB—the client uses this message to determine the script version to specify to an HTTP server when sending a e-Card record. The server responds with a $SWUPGSUB message indicating the script.

GHBS—the client uses this message to determine the home base for the author's Web pages. The server responds with a $SWUPGHBS message indicating the home base which will be used for the author's Web pages. Usually, the home base is not needed for authoring the Web pages if they have only relative references, but an author might want to make an absolute reference in a link or in HTML text.

GCAT—the client uses this message to obtain a list of categories. The categories pertain to subjects under which the author's e-Card record is to be found. The server responds with a $SWUPGCAT message containing the category list, with one message per category item.

GCRD—the client uses this message to obtain the e-Card record for the ID specified in the message. The server responds with a $SWUPSCRD message containing the e-Card record, with one message per e-Card data element. While anyone can submit a GCRD record for an ID, only the author can change the e-Card data. An author changes e-Card data by submitting a multi-part dataset (including password) using the script retrieved using the GSUB message.

GKBL—the client uses this message to determine the file upload limit in kilobytes (KB). The server responds with a $SWUPGKBL message indicating the file upload limit. The total size of an upload package accepted by the server must be less than or equal to the file upload limit.

GPRC—the client uses this message to determine the price for uploading a given size upload. The parameter for the message indicates how big the upload will be. The server responds with a $SWUPGPRC message indicating the price for an upload of the specified size.

GPFM—the client uses this message to determine the pricing formula in effect. The server responds with a $SWUPGPFM message as illustrated by the example in Appendix C, which is explained in further detail below.

GTIM—the client uses this message to determine the frequency of server updates. The server responds with a $SWUPGTIM message indicating how often updates occur (expressed as a number of hours). A typical update frequency might be every three hours. The update frequency is used to determine when changes uploaded to the server will take effect and be visible to a browser browsing the changed pages.

GKEY—the client uses this message as part of a public key exchange for use in encrpyting data such as the author's credit card number or authorization data block. The server interprets the parameter of the GKEY message as the public key of the client. The server responds with a $SWUPGKEY message containing the public key of the server, possibly encrypted using the public key provided by the client. The key may be unique, depending upon the data sent and the method of key generation. Depending upon the key management protocol, the key may be a public key or a symmetric key.

GHST—the client uses this message to determine the server's host name. The server responds with a $SWUPGHST message indicating the host name. This allows for a negotiation for placement of a website, which need not be on the same server as the SWUP server.

In addition to the above commands, the client will send e-Card records as POST messages to the e-Card submission CGI script. Files are uploaded as MIME messages according to RFC 1867 (which is incorporated herein by reference for all purposes), as illustrated by Appendix C and D.

TABLE 2

SWUP Server Messages

| Message | Parameters | Description |
| --- | --- | --- |
| $SWUPGMRV | minimum required version | Response to client message |
| $SWUPGMLT | path to script | " |
| $SWUPGSUB | path to script | " |
| $SWUPGHBS | home base URL | " |
| $SWUPGCAT | category list element | " |
| $SWUPSCRD | e-Card data element | " |
| $SWUPGKBL | maximum upload size | " |
| $SWUPGPRC | upload price | " |
| $SWUPGPFM | pricing formula | " |
| $SWUPGTIM | time between updates | " |
| $SWUPGKEY | server's public key | " |
| $SWUPGHST | server host name | " |
| $SWUPSCID | e-Card id | Returning e-Card ID |
| $SWUPAECD | | e-Card successfully added |
| $SWUPUECD | | e-Card successfully updated |
| $SWUPSPAS | password | |
| $SWUPSOLD | old e-Card data elements | |
| $SWUPEIID | | Invalid ID Code error |
| $SWUPEBUT | | Inappropriate Language error |
| $SWUPEEML | | Invalid E-mail Address error |
| $SWUPEDUP | | Duplicate e-Card error |
| $SWUPEPWD | | Invalid password error |
| $SWUPEMIS | | Missing Required Fields error |
| $SWUPENID | | No e-Card ID error |
| $SWUPUNSF | | Unsafe Character in Filename error |
| $SWUPTERMINATE | | Client-server session terminated |

TABLE 2-continued

SWUP Server Messages

| Message | Parameters | Description |
| --- | --- | --- |
| $SWUPSUCCESS | | Success |
| $SWUPUPLOAD | | Upload successful (and files stored) |

Each of the server messages might actually be identified in the transmission process by a numerical code for efficient communications, much like an FTP (file transfer protocol) server might respond with numerical codes. Table 3 lists the numerical codes for the above server messages.

TABLE 3

Server Message Codes

| Message | Code |
| --- | --- |
| $SWUPGMRV | 200 |
| $SWUPGHBS | 201 |
| $SWUPGPRC | 202 |
| $SWUPGKBL | 203 |
| $SWUPGTIM | 204 |
| $SWUPGMLT | 205 |
| $SWUPGSUB | 206 |
| $SWUPGKEY | 207 |
| $SWUPGCAT | 208 |
| $SWUPGPFM | 210 |
| $SWUPGHST | 209 |
| $SWUPSCID | 300 |
| $SWUPAECD | 301 |
| $SWUPUECD | 302 |
| $SWUPSPAS | 303 |
| $SWUPSCRD | 304 |
| $SWUPSOLD | 305 |
| $SWUPEIID | 400 |
| $SWUPEBUT | 401 |
| $SWUPEEML | 402 |
| $SWUPEDUP | 403 |
| $SWUPEPWD | 404 |
| $SWUPEMIS | 405 |
| $SWUPENID | 406 |
| $SWUPUNSF | 407 |
| $SWUPTERMINATE | 666 |
| $SWUPSUCCESS | 250 |
| $SWUPUPLOAD | 251 |

The details of the server messages are as follows:

$SWUPGMRV—return the minimum required version in response to a GMRV message. If the client reports a version number lower than the minimum required version, the server also sends the $SWUPTERMINATE message.

$SWUPGHBS—return the home base for uploads in response to a GHBS message. The home base is used by the client to construct a URL (Universal Resource Locator). An example home base is http://www.linkstar.com/page. Note that the home base can differ from the actual path on the server used to store the web pages.

$SWUPGPRC—return the price of the upload in response to a GPRC message. The price is a function of the size of the upload in kilobytes. The size is sent by the client as part of the GPRC message.

$SWUPGPFM—return the price formula in effect in response to a GPRC message. The price formula indicates the price for an upload (either a one time fee or a monthly or other periodic fee). In the example shown in Appendix C, the parameter of the $SWUPGPFM message is:

1˜100˜9.95|101˜1024˜19.95|˜1024˜10.00.

which is interpreted to mean that the cost of an upload of between 1 and 100 kilobytes is $9.95, the cost of an upload of between 101 and 1024 kilobytes is $19.95, and above 1024 kilobytes, each additional 1024 kilobytes is an additional $10.00. Of course, other pricing formulas could be used in place of the example pricing formula.

$SWUPGKBL—return the size of maximum upload permitted in response to a GKBL message.

$SWUPGTIM—return the time between updates in response to a GTIM message. This parameter is used because the databases available to readers might not be updated immediately, so the server tells the client how long to wait before the uploaded data is available.

$SWUPGMLT—return the multi-part upload script path in response to a GMLT message. The script handles file uploads as MIME messages according to RFC 1867. See the multi-part MIME Format Example shown in Appendix D.

$SWUPGSUB—return the submit-ecard script path in response to a GSUB message. The submit-ecard script handles e-Card submissions and updates. The format of an e-Card submission is shown in Appendix D.

$SWUPGKEY—return an encryption key in response to a GKEY message. The encryption key is usually a public key used by the client to encrypt a symmetric key. See Also: LinkStar Key Management Protocol, Applied Cryptography, BSAFE 3.0 User's Manual.

$SWUPGCAT—return an individual category list item. Several $SWUPGCAT messages are returned in response to a GCAT message.

$SWUPGHST—return the host name. This is the name of the host that the client will use for all future connections.

$SWUPSCID—return the author's ID. This e-Card ID uniquely identifies the author's e-Card. This message is sent as part of the e-Card Create Request.

$SWUPAECD—the server sends this message when an e-Card is successfully added. This message is sent as part of the e-Card submission process.

$SWUPUECD—the server sends this message when an e-Card is successfully updated. This message is sent as part of the e-Card submission process.

$SWUPSPAS—the server sends this message to indicate the author's password following an e-Card create request.

$SWUPSCRD—the server sends this message in response to a GCRD message. This message indicates the latest e-Card data for the ID given in the GCRD message.

$SWUPSOLD—the server sends this message to indicate old e-Card data.

$SWUPEIID, $SWUPEBUT, $SWUPEEML, $SWUPEDUP, $SWUPEPWD, $SWUPEMIS, $SWUPENID, $SWUPUNSF—the server sends these error messages in response to the occurrence of their respective errors.

$SWUPTERMINATE—the server sends this message to indicate that a SWUP session has been terminated. One reason to terminate a session is where the server determines that the client is of a version earlier than the server is willing to support.

$SWUPSUCCESS—the server sends this message to indicate that a SWUP message was received and parsed correctly.

$SWUPUPLOAD—the server sends this message to indicate that the new e-Card data or new web files were uploaded correctly and stored in either e-Card database 48 or web depository 34.

Figure 4:
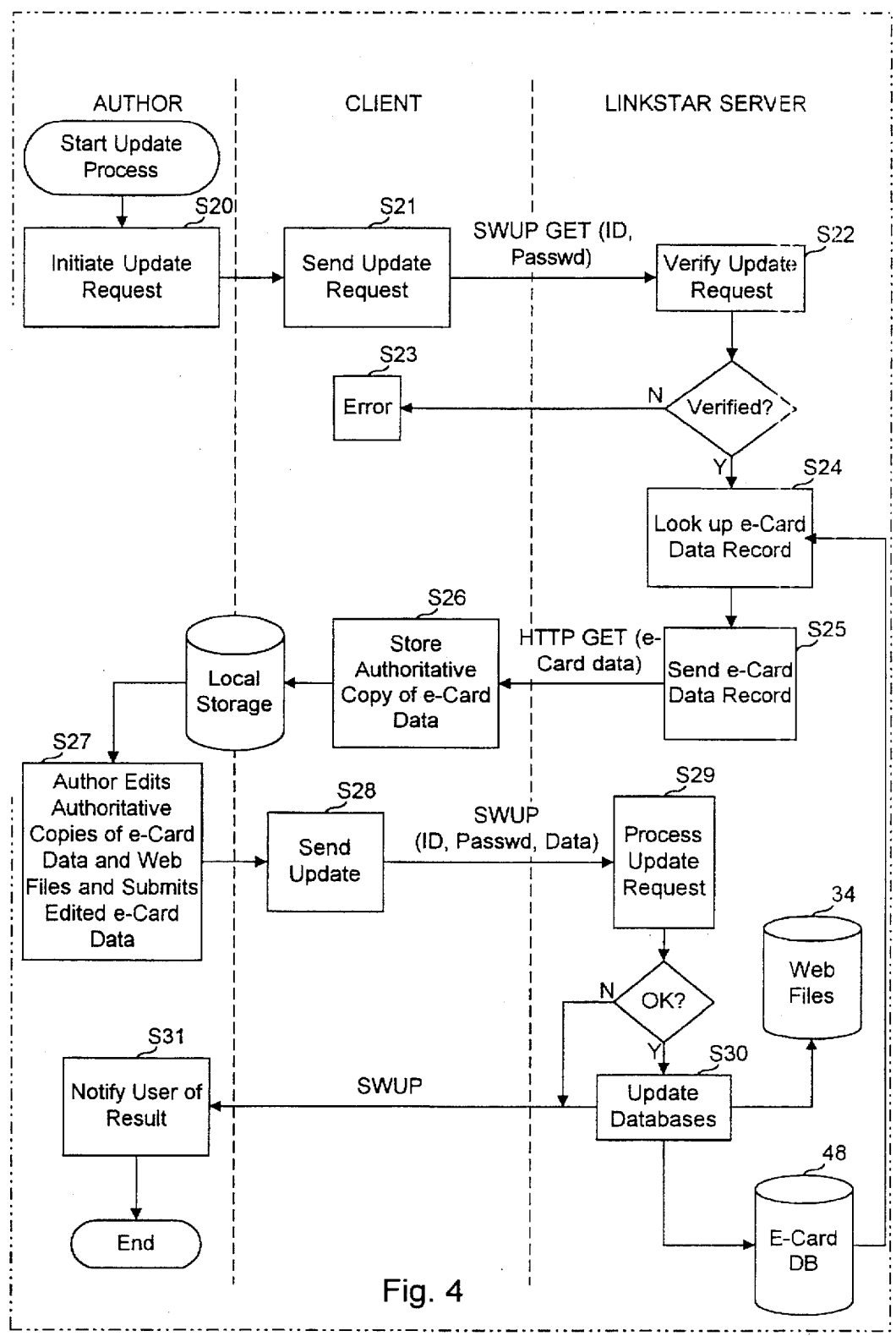
FIG. 4 is a block diagram of a process of updating the hypertext pages on the hypertext server.

Referring now to FIG. 4, a process of updating an author's web files stored in web depository 34 or the author's e-Card record in e-Card database 48 is shown. The flow chart of FIG. 4 is numbered from S20 to S31 and is preformed in increasing numerical order unless otherwise indicated.

The process begins with the author initiating an update request (S20), typically after having edited their web pages. Since the authoritative copy of the author's web pages are those stored locally and can be edited prior to this process, but the authoritative copy of the author's e-Card record is stored in e-Card database 48, so the author does not edit their e-Card data at this time.

Client 44 sends an update request to server 18 to initiate the update process at the server (S21). Server 18 receives the update request and verifies the ID and password (S22). If they are not valid, server 18 returns an error message (S23) such as a $SWUPEIID, $SWUPEPWD, or $SWUPENID message. Otherwise, if the request is valid, server 18 looks up the e-Card data from e-Card database 48 (S24) and sends it to client 44 (S25) as a series of $SWUPSCRD messages.

Once an authoritative copy of the author's e-Card record is received, it is stored locally (S26) and the author edits the e-Card record (S27), if desired, and sends the edited e-Card record and the updated web files along with the author's ID and password (S28) to server 18. Server 18 processes the received updated pages and record (S29), and if it is acceptable, server 18 updates the e-Card database 48 and web file depository 34 (S30). Either way, server 18 informs the author of the result (S31) with a $SWUPUPLOAD message for successful uploads or an error message such as $SWUPEMIS. Several filtering errors might occur at this point. For example, server 18 might return an error message which indicates that the e-Card or a web page contains inappropriate language ($SWUPEBUT), contains an invalid e-mail address ($SWUPEEML), or contains a file reference to a file name with "unsafe" characters likely to cause problems ($SWUPUNSF).

The above description describes how a nontechnical author can create web pages and have them installed on a server where they are accessible to the public without the author having to be familiar with the workings of HTTP. Another benefit of a publishing system according to the present invention is that members of the public (readers) browsing such pages will see pages customized in a number of ways, to accommodate "publishing partners" and the reader. If a publishing partner wants to use the central e-Card database for its own use and the use of its customers, the partner can make an e-Card search engine appear to the user to be the search engine of the partner. One way of implementing this feature is for the partner to provide a link from its pages to the server in a way that identifies the partner. For example, the ABC Company (C_ID=abcinc) might be a partner. On ABC's web site or other search engine, the URL pointing to the search engine might be:

http://www.linkstar.com/home/partners/abcinc with the central server responding to such a URL with a customized search engine page. Such customization might be a simple as adding "Welcome to ABC, Inc.'s e-Card Directory" as a header/title.

In order to preserve the customization over multiple transfers, since HTTP URL requests and responses are stateless, the C_ID of the partner is maintained in each subsequent URL. The referring page which referred the client to the partner search engine page can be captured by the server on the first referral and maintained from link to link over the stateless connection so that a "return to partner" button can be implemented. For example, if the reader followed the above link, a button to a subsequent link might have the following URL:

http://www.linkstar.com/home/partners/abcinc?\

ORIGIN=abcinc&ORIGIN_REFERRER=http://www.abcinc . . .

(In the above line, and elsewhere in this specification, single strings of characters unbroken by line breaks or spaces are shown broken into multiple lines so as to fit on the page, but should be interpreted as single strings. In such cases, a line is terminated with a backslash ("\") character. Neither the backslash nor the line break are part of the expression.)

Carrying the ORIGIN_REFERRER value along with each URL allows each page to provide a link back to the partner's page without requiring the reader to navigate back through all the pages navigated or the server know in advance which referring page the reader comes from. Advertisements on any given page can also be customized based on the maintained state of the reader's URL's. If the ORIGIN field is identified as ABC, Inc.'s origin, then ABC might request that only its advertisements, or all advertisements but those of its competitors be shown.

Pages might also be customized based on the reader's ID, if the reader has an e-Card. How this is accomplished is illustrated by the flow chart/data flow diagram of FIG. 5. Using this process, a reader enters their ID, if the reader has an ID (S40) and requests a page of the reader's browser (S41). The browser sends an HTTP GET command containing the ID, the requested URL, the name of the reader's host and the referring link. The referring link is the URL of the page, if one was used, which pointed to the currently requested page. Once this information is received by server 18, the server looks up the ID (S42) in e-Card database 48, looks up the URL (S43) in web file depository 34 and customizes the retrieved page (S44) with customization data 50 before sending the page onto the client (S45) as an HTML file. The reader's browser then displays the returned page (S46).

Figure 6:
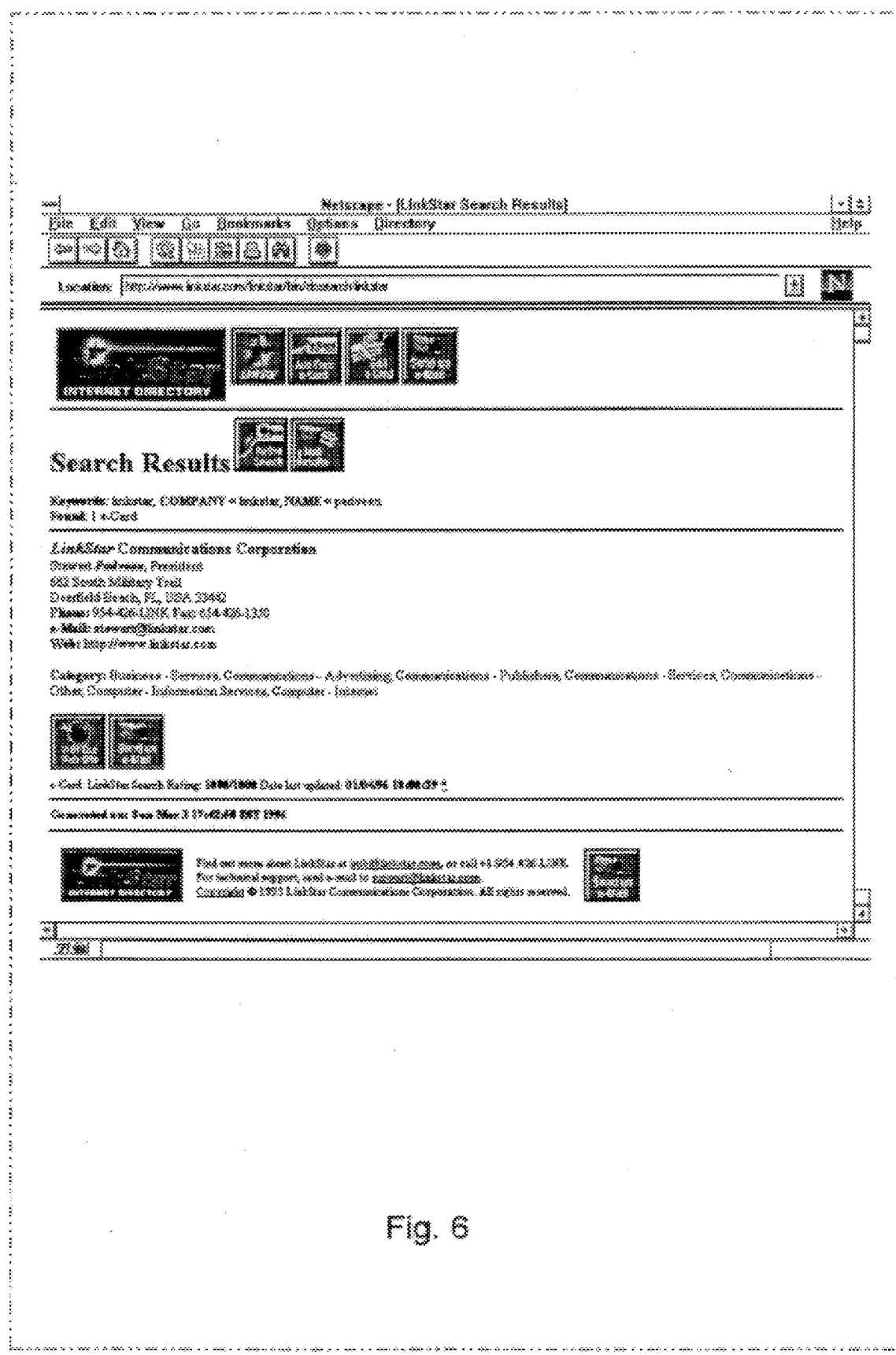
FIG. 6 is a screen capture of a hypertext page displayed in a browser according to the present invention.

FIG. 6 is a screen capture of a display showing a returned page.

Figure 7:
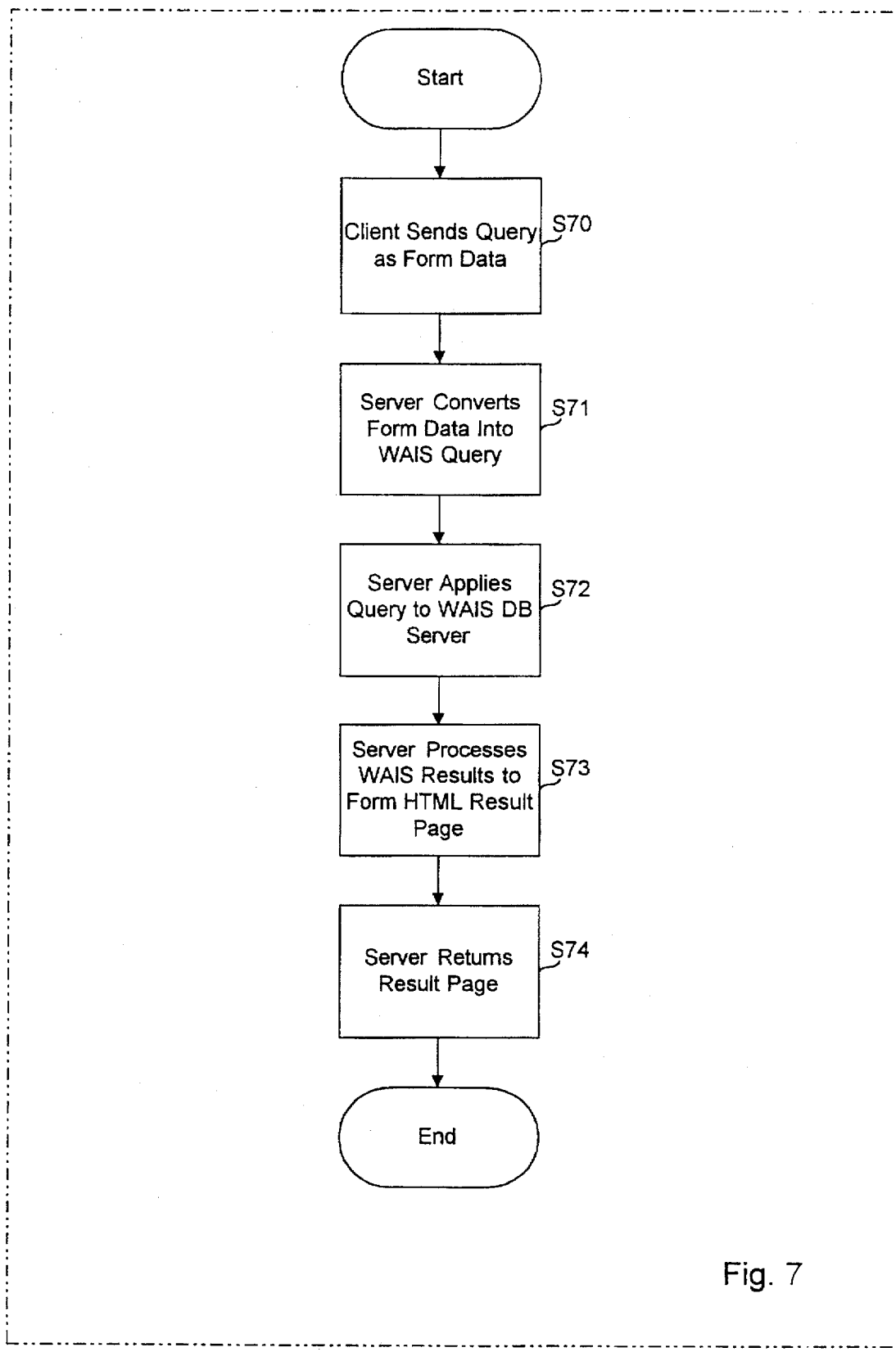
FIG. 7 is a flow chart illustrating a process using a database server interfaced to a hypertext transport protocol server and client.

In some cases, a database search might need to be done for retrieve information requested by a reader. In order to present this information in an understandable form, server 18 includes a capability of running database searches using the reader's browser as a front end. This process is shown in FIG. 7, wherein a client sends a query as HTTP FORM data (S70). Server 128 converts this FORM data into a Wide Area Information Search (WAIS) query (S71) and applies the WAIS query to a WAIS database server (S72). Server 18 processes the WAIS results to form an HTML result page (S73) and returns the HTML page so formed to the reader (S74). Other full text search engines, such as the Open Text search engine, might be used in place of the WAIS engine.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

20

APPENDIX A. SAMPLE CLIENT LSP.INI FILE

This Appendix is an example of a configuration file (.INI file) containing the local variables for a client.

```
[LSP]
Version=1.1
HostAddress=199.227.124.100
HostName=miami.linkstar.com
CategoryFile=C:\LINKSTAR\CATEGORY.TXT
CountryFile=C:\LINKSTAR\COUNTRY.TXT
HomeBase=http://www.linkstar.com/page
MultiCGI=/linkstar/bin/mp11
SubmitCGI=/linkstar/bin/lp-submit-ecard
C_CREDIT_NUMBER=0000 0000 0000 0000
C_CREDIT_EXPIRES=04/97
C_CREDIT_NAME=Bob Bunk
SWUPCGI=/linkstar/bin/swup
Port=8080
LSPPATH=C:\LINKSTAR\LSP.EXE
C_COMPANY=OQV
C_COUNTRY=US
C_NAME=Contact
C_NAMET=Title
C_ADDRESS1=address1
C_ADDRESS2=address2
C_CITY=Capital City
C_STATE=FL
C_ZIP=00000-0000
C_PHONE=000-000-0000
C_FAX=000-000-0000
C_TOLL=800-000-000
C_EMAIL=louis@linkstar.com
C_MAINT=louis@linkstar.com
C_DESC=test
C_HOME=http://www.linkstar.com/page/oqv1/home.htm
AutoExit=-1
Country=USA
Category 1=BUSI-ACCT
CategoryCount= 1
FileListCount= 2
FileList 1=C:\LSP10\SAMPLE\EGYPT\OBJETS.GIF
FileList 2=C:\LSP10\SAMPLE\EGYPT\SCULPT1.GIF
FileList 3=C:\LSP10\SAMPLE\EGYPT\MUMMY.GIF
SelectPath=c:\lsp10\SAMPLE\EGYPT
FileList 4=C:\LSP10\SAMPLE\EGYPT\OBJETS.HTM
Category 2=BUSI-BANK
FileList 5=C:\LSP10\SAMPLE\EGYPT\OBJETS1.GIF
FileList 6=C:\LSP10\SAMPLE\EGYPT\OBJETS2.GIF
FileList 7=C:\LSP10\SAMPLE\EGYPT\PAINT.GIF
FileList 8=C:\LSP10\SAMPLE\EGYPT\PAINT.HTM
FileList 9=C:\LSP10\SAMPLE\EGYPT\PAINT1.GIF
FileList 10=C:\LSP10\SAMPLE\EGYPT\PAINT2.GIF
FileList 11=C:\LSP10\SAMPLE\EGYPT\SCULPT.GIF
FileList 12=C:\LSP10\SAMPLE\EGYPT\SCULPT.HTM
FileList 13=C:\LSP10\SAMPLE\EGYPT\SCULPT1.GIF
FileList 14=C:\LSP10\SAMPLE\EGYPT\SCULPT2.GIF
```

21

```
    FileList 15=C:\LSP10\SAMPLE\EGYPT\SCULPT2.GIF
    FileList 16=C:\LSP10\SAMPLE\EGYPT\SCULPT2.GIF
    FileList 17=C:\LSP10\SAMPLE\EGYPT\SCULPT2.GIF
    HomePage=C:\LSP10\SAMPLE\EGYPT\HOME.HTM
5   C_PASSWORD=qr03fsmc
    C_ID=oqv1
```

APPENDIX B. E-CARD DATABASE FIELDS

"Req." indicates whether or not the field is required to create an e-Card record. Submissions without at least the required fields will result in the server sending a $SWUPEMIS error message.

| Name | Req. | Type | Description |
|---|---|---|---|
| C_ID | Y | string | ID (key) |
| C_COMPANY | Y | string | Company name (used to derive C_ID) |
| C_NAME | N | string | Person's name |
| C_NAMET | N | string | Person's title |
| C_ADDRESS | N | string | Address line 1 |
| C_ADDRESS1 | N | string | Address line 2 |
| C_CITY | N | string | City |
| C_STATE | N | 2/3 alpha | State or province code |
| C_COUNTRY | N | 2 alpha | Country code (same as Internet TLD) |
| C_ZIP | N | string | ZIP or other postal code |
| C_EMAIL | N | E-mail address | E-mail address for e-Card |
| C_MAINT | Y | E-mail address | E-mail address for maintainer |
| C_PHONE | N | string | Phone number |
| C_FAX | N | string | Fax number |
| C_TOLL | N | string | Toll Free phone number |
| C_CATEGORY | Y | list | LinkStar Category Codes, comma delimited |
| C_DESC | N | string | Description |
| C_HOME | N | URL | URL of home page |
| C_ICON | N | URL | URL of icon |
| C_ICONW | N | integer | Width of C_ICON in pixels |
| C_ICONH | N | integer | Height of C_ICON in pixels |
| C_DATE_CREATE | Y | date | Date e-Card created |
| C_DATE_UPDATE | Y | date | Date e-Card updated |

A second database parallel to the e-Card database is kept, with the following (required) fields for each e-Card:

| Name | Type | Description |
|---|---|---|
| C_MAINT | E-mail address | E-mail address for maintainer (key) |
| PL_PASSWORD | string | Password |
| PL_ID | list | List of e-Card ID's for this maintainer, comma delimited |

23

APPENDIX C. EXAMPLE "ADD E-CARD" CONVERSATION

The server messages are shown here in numerical form. Their string equivalents are shown in Table 3.

| Client Messages: | Server Responses: |
|---|---|
| GMRV 1.1 | 200 0.5 |
|  | 250 success |
| GHST 1.1 | 209 www.linkstar.com |
|  | 250 success |
| GMLT 1.1 | 205 /linkstar/bin/mp11 |
|  | 250 success |
| GSUB 1.1 | 206 /linkstar/bin/mp11 |
|  | 250 success |
| GHBS 1.1 | 201 http://www.linkstar.com/page |
|  | 250 success |
| GCAT 1.1 | 208 BUSI-ACCT~Business~Accounting |
|  | 208 BUSI-BANK~Business~Banking |
|  | 208 <message for each further category> |
|  | 250 success |
| GPFM 1.1 | 210 1~100~9.95\|101~1024~19.95\|^1024~10.00 |
|  | 250 success |

To obtain a new e-Card ID, the client submits to the mp11 script the following parameters:

C_COMPANY=ABC%2C%20Inc.&C_CATEGORY=\
BUSI=0000&C_EMAIL=postmaster@abcinc...

The client follows this conversation with an upload of an e-Card to http://www.linkstar.com/linkstar/bin/mp11 (the script indicated by the server's responses) or an upload of web files to the directory http://www.linkstar.com/page/abcinc as indicated by the server's responses (assuming C_ID=abcinc). A possible server response is:

300 abcinc
303 br53i7th
301 Your e-Card has been added to the LinkStar directory
250 success Once the client has obtained the author's password, the client might update an e-Card by sending the following parameter set:

C_ID=abcinc&C_COMPANY=ABC%2C%20Inc.&\
PL_PASSWORD=br53i7th&PL_TRANS=UPDATE&C_CATEGORY=\
BUSI=0000&C_EMAIL=postmaster@abcinc...

24

APPENDIX D. EXAMPLE POSTING OF A NEW SITE

This Appendix is an example of an uploading process of an
e-Card and web pages as might occur in the process shown in
Fig. 3 between steps S2 and S9.

Client:

SWUP_PARAMETER=GHST&SWUP_VALUE=1.1

Server: *[abridged - not all of HTTP header shown. Note that
the server returns a code "209" instead of the name of the
server message. The name corresponding to 209 is $SWUPGHST,
per Table 3.]* content-type: text/plain
209 pages.linkstar.com

Client: (the following is uploaded to the script or file)

---- multipart upload follows ---

Content-type: multipart/form-data; boundary=LEVEL1-BOUNDARY-XZ

--LEVEL1-BOUNDARY-XZ
Content-disposition: form-data; name="VERSION"
Content-type: text/plain 1.0
--LEVEL1-BOUNDARY-XZ
Content-disposition: form-data; name="C_ID"
Content-type: text/plain pbwares
--LEVEL1-BOUNDARY-XZ
Content-disposition: form-data; name="C_CREDIT_NUMBER"
Content-type: text/plain 0000000000000000
--LEVEL1-BOUNDARY-XZ
Content-disposition: form-data; name="C_CREDIT_EXPIRES"
Content-type: text/plain 04/97
--LEVEL1-BOUNDARY-XZ
Content-disposition: form-data; name="C_CREDIT_NAME"
Content-type: text/plain Bob Bunk
--LEVEL1-BOUNDARY-XZ
Content-disposition: form-data; name="files"
Content-type: multipart/mixed, boundary=LEVEL2-BOUNDARY-XZ --LEVEL2-BOUNDARY-XZ
Content-disposition: attachment; filename="HOME.HTM"
Content-Type: text/plain

25

```
     <!DOCTYPE HTML SYSTEM "legacy.dtd">
     <HTML>
     <HEAD>
     <TITLE>Egyptian Museum</TITLE>
 5   </HEAD>
     <BODY>
     <CENTER><IMG SRC="egypt.gif" ALT=" Egyptian Museum Masthead "
     ></CENTER>
     <P>
10   <P>
     <HR>
     <P>
     <CENTER><H1>Choose Below for a Preview of Painting, Sculpture,
     and Objets d'Art.</H1>
15   <P>
     <BR>
     <P>
     </CENTER>
     <P>
20   <TABLE>
     <TR>
     <TH width=600><H2><A HREF="paint.htm">Painting</A></H2></TH>
     </TR>
     </TABLE>
25   <TABLE>
     <TR>
     <TH width=600><A HREF="paint.htm"><IMG SRC="paint.gif"
     ></A></TH>
     </TR>
30   </TABLE>
     </CENTER>
     </P>
     <TABLE>
     <TR>
35   <TH width=285><H2><A HREF="sculpt.htm">Sculpture</A></H2></TH>
     <TH width=300><H2><A HREF="objets.htm">Objets d'
     Art</A></H2></TH>
     </TR>
     </TABLE>
40   <TABLE>
     <TR>
     <TH width=300><H2><A HREF="sculpt.htm"><IMG SRC="sculpt.gif"
     ></A></TH>
     <TH width=320><H2><A HREF="objets.htm"><IMG SRC="objets.gif"
45   ></A></TH>
     </TR>
     </TABLE>
     </CENTER>
     <HR>This sample home page was created for LinkStar
50   Communications Corporation by Nancy K. Arnold Hubert <A
     HREF="mailto:nancy@linkstar.com">nancy@linkstar.com</A>.
     </BODY>
     </HTML>

55   --LEVEL2-BOUNDARY-XZ
     Content-disposition: attachment; filename="OBJETS.HTM"
     Content-Type: text/plain
```

26

```
    <!DOCTYPE HTML SYSTEM "legacy.dtd">
    <HTML>
    <HEAD>
    <TITLE>Sample Page Objets d'art</TITLE>
 5  </HEAD>
    <BODY>
    <P>
    <CENTER>
    <H1>Objets d'Art</H1></P>
10  <BR>
    </CENTER>
    <P>
    <CENTER>
    The following shows two previews of objets d'art from the
15  period spanning 3000 B.C. to 1350 B.C.</P>
    </CENTER>
    <HR>
    <P>
    <CENTER>
20  <H2>Title</H2></P>
    <P>
    Palette of Narmer</P>
    <P>
    <H2>Date</H2></P>
25  <P>
    3000 B.C.</P>
    <P>
    <H2>Description</H2></P>
    <P>
30  Slate, 25 inches high, from Hierakonpolis</P>
    <P>
    <BR>
    <CENTER>
    <IMG SRC="objets1.gif" >
35  </CENTER>
    <BR>
    <P>
    <BR>
    <H2>Fascinating Facts</H2></P>
40  <P>
    Ancient Egyptians used palettes, such as the Palette of
    Narmer, to prepare eye makeup. The front of the palette shows
    King Narmer wearing the cobra crown of Lower Egypt.  He
    surveys a pile of beheaded enemies.  The back of the palette
45  depicts the king about to slay an enemy.  Horus, the sky god
    hawk to the right of the king, and another god, Hathor, shown
    as two heads at the top of the palette, protect the king.  Two
    fallen enemies lay below the king.</P>
    </CENTER>
50  <P>
    <HR>
    <CENTER>
    <H2>Title</H2></P>
    <P>
55  Chest</P>
    <H2>Date</H2></P>
    <P>
```

```
1350 B.C.</P>
<P>
<H2>Description</H2></P>
<P>
Painted chest, 20 inches long, from the tomb of Tutankhamun at
Thebes</P>
<P>
<BR>
<P>
<CENTER>
<IMG SRC="objets2.gif" >
</CENTER>
<P>
<BR>
<H2>Fascinating Facts</H2></P>
<P>
The lid depicts King Tutankhamun hunting animals in the
desert.  The side panel represents the king riding against the
enemies of Egypt.  The painting on the chest represents the
Amarna style, Egyptian traditional style, and the influence of
Cretan art.  The Amarna style shows figures in freer
expression than the traditional style, yet the flatness and
formality of the traditional style is also evident. Cretan
influence is shown in the lively naturalism of the
figures.</P>
</CENTER>
<P>
<HR>
<BR>
<CENTER><A HREF = "home.htm"><IMG SRC="mummy.gif" ></A>
</CENTER>
</BODY>
</HTML>

--LEVEL2-BOUNDARY-XZ
Content-disposition: attachment; filename="PAINT.HTM"
Content-Type: text/plain <!DOCTYPE HTML SYSTEM "legacy.dtd">
<HTML>
<HEAD>
<TITLE>Sample Page Painting</TITLE>
</HEAD>
<BODY>
<P>
<CENTER>
<H1>Painting</H1></P>
<BR>
</CENTER>
<P>
<CENTER>
The following shows two previews of paintings from the period
spanning 2530
B.C. to 1450 B.C.</P>
</CENTER>
<HR>
<P>
```

```
        <CENTER>
        <H2>Title</H2></P>
        <P>Geese of Medum</P>
        <P><H2>Date</H2></P>
 5      <P>2530 B.C.</P>
        <P><H2>Description</H2></P>
        <P>Dry fresco, approximately 18 inches high.</P>
        <P>
        <BR>
10      <CENTER>
        <IMG SRC="paint1.gif" >
        </CENTER>
        <BR>
        <P>
15      <BR>
        <H2>Fascinating Facts</H2></P>
        <P>
        The Geese of Medum are an example of the Egyptian Old Kingdom,
        dating from 2665 B.C. to 2155 B.C.  The artists who painted
20      animals during this period demonstrated empathy with nonhuman
        creatures in their paintings.  The paintings typically alluded
        to the power to share the being of the animal and to feel the
        animal's feelings.  The fresco secco technique, in which the
        plaster dries before the artist applies paint, lends itself to
25      the delicate rendering of the geese.</P>
        </CENTER>
        <P>
        <HR>
        <CENTER>
30      <H2>Title</H2></P>
        <P>Fowling Scene </P>
        <H2>Date</H2></P>
        <P>1450 B.C.</P>
        <P><H2>Description</H2></P>
35      <P>
        Wall painting from the tomb of Nebamun, Thebes.  Painting on
        dry plaster.</P>
        <P>
        <BR>
40      <P>
        <CENTER>
        <IMG SRC="paint2.gif" >
        </CENTER>
        <P>
45      <BR>
        <H2>Fascinating Facts</H2></P>
        <P>
        The Fowling Scene shows the persistence of ancient Egyptian
        art formulas to project an image onto a flat surface.  A
50      deceased nobleman stands in his boat and drives the birds from
        a papyrus swamp with his throwstick.  He holds three birds he
        has caught in his right hand.  A wild cat in front of him has
        also caught two birds.  The two companions are most likely his
        wife and child.  Their scaled down sizes in proportion to his
55      represent their rank.  Only cat, fish, and bird are
        represented in a naturalistic style in contrast to the typical
        flatness of the other objects in the painting.</P>
```

```
</CENTER>
<P>
<HR>
<BR>
<CENTER><A HREF = "home.htm"><IMG SRC="mummy.gif" ></A>
</CENTER>
</BODY>
</HTML>

--LEVEL2-BOUNDARY-XZ
Content-disposition: attachment; filename="SCULPT.HTM"
Content-Type: text/plain <!DOCTYPE HTML SYSTEM "legacy.dtd">
<HTML>
<HEAD>
<TITLE>Sample Page Sculpture</TITLE>
</HEAD>
<BODY>
<P>
<CENTER>
<H1>Sculpture</H1></P>
<BR>
</CENTER>
<P>
<CENTER>
The following shows two previews of sculptures from the period
spanning 2500 B.C. to 1360 B.C.</P>
</CENTER>
<HR>
<P>
<CENTER>
<H2>Title</H2></P>
<P>Khafre, side and front </P>
<P><H2>Date</H2></P>
<P>2500 B.C.</P>
<P><H2>Description</H2></P>
<P>Diorite sculpture from Gizeh, 66 inches high</P>
<P>
<BR>
<CENTER><IMG SRC="sculpt1.gif" ></CENTER>
<BR>
<P>
<BR>
<H2>Fascinating Facts</H2></P>
<P>
The statue of Khafre is one of many found near the Sphinx.
The sculpture was carved for the valley tomb of Khafre.  It
starkly contrasts to the geometric structure of the temple,
which has flat-planed posts and lintels.  Carved on the base
of the throne are symbols of united Egypt, the intertwined
lotus and papyrus.  The hawk, Egyptian symbol of the sun,
shelters and protects the head of Khafre.</P>
</CENTER>
<P>
<HR>
<CENTER>
```

```
       <H2>Title</H2></P>
       <P>King Smenkhkare and Meritaten </P>
       <H2>Date</H2></P>
       <P>1360 B.C.</P>
 5     <P><H2>Description</H2></P>
       <P>Painted limestone relief, 9.5 inches high</P>
       <P>
       <BR>
       <P>
10     <CENTER><IMG SRC="sculpt2.gif" ></CENTER>
       <P>
       <BR>
       <H2>Fascinating Facts</H2></P>
       <P>
15     King Smenkhkare was the half-brother of Akhenaton.  He and
       Akhenaton ruled Egypt together during the last three years
       Akhenaton's reign.  This sculpture is a departure from the
       traditional art of the time in which artists represented
       exalted persons in a formal pose.  Instead, King Smenkhkare
20     has one leg at ease and leans casually on his staff.
       Traditional art also depicted the figure size based on rank.
       Here, however, the king's wife, Princess Meritaten, is shown
       the same scale as her husband.</P>
       </CENTER>
25     <P>
       <HR>
       <BR>
       <CENTER><A HREF = "home.htm"><IMG SRC="mummy.gif" ></A>
       </CENTER>
30     </BODY>
       </HTML>

--LEVEL2-BOUNDARY-XZ--
       --LEVEL1-BOUNDARY-XZ--
35

Server:

content-type: text/plain
40     251 Upload Successful
```

What is claimed is:

1. A method for posting hypertext documents to a hypertext server to form an accessible hypertext document comprising a plurality of hypertext pages secured against unauthorized modification, the method comprising the steps of:

authoring the hypertext pages on a client computer;

sending an add request from the client computer to a server computer;

generating, at the server computer, a unique identifier for an author of the hypertext document;

sending an indication of the unique identifier to the client computer;

obtaining a charge authorization from the author;

sending a database entry request from the client computer to the server computer, wherein the database entry request comprises the unique identifier, the charge authorization and the hypertext files;

at the server, verifying a validity of the charge authorization; and if the charge authorization is valid, storing the hypertext pages in association with the unique identifier and sending a password to the client associated with the unique identifier.

2. The method of claim 1 further comprising, the hypertext pages including a home page and lower level pages containing relative references to the home page.

3. The method of claim 1 further comprising a step of adding an entry to a directory searchable by subject, wherein the entry refers to at least one page of the hypertext pages.

4. The method of claim 1, wherein the association of the hypertext pages with the unique ID is by assigning an URL to the hypertext pages without manual intervention.

* * * * *